United States Patent
Casey

(10) Patent No.: US 8,213,422 B2
(45) Date of Patent: Jul. 3, 2012

(54) SELECTIVE INTERNET PRIORITY SERVICE

(75) Inventor: Liam Casey, Ottawa (CA)

(73) Assignee: Rockstar Bidco, LP, New York, NY (US)

(*) Notice: Subject to any disclaimer, the term of this patent is extended or adjusted under 35 U.S.C. 154(b) by 1211 days.

(21) Appl. No.: 10/859,994

(22) Filed: Jun. 4, 2004

(65) Prior Publication Data

US 2005/0271048 A1 Dec. 8, 2005

(51) Int. Cl.
*H04L 12/28* (2006.01)

(52) U.S. Cl. ............ 370/389; 726/2; 726/28; 713/201

(58) Field of Classification Search ........... 370/230, 370/230.1, 395.42, 444, 455, 352, 395.21, 370/342; 713/150, 201; 463/42; 709/219, 709/230; 705/64; 386/46, 109, 125; 726/2, 726/28
See application file for complete search history.

(56) References Cited

U.S. PATENT DOCUMENTS

| | | | | |
|---|---|---|---|---|
| 6,449,251 B1 * | 9/2002 | Awadallah et al. | ............ | 370/229 |
| 6,680,933 B1 * | 1/2004 | Cheesman et al. | ............ | 370/352 |
| 6,704,489 B1 * | 3/2004 | Kurauchi et al. | ............ | 386/248 |
| 6,778,525 B1 * | 8/2004 | Baum et al. | ............ | 370/351 |
| 6,816,907 B1 * | 11/2004 | Mei et al. | ............ | 709/229 |
| 6,959,335 B1 * | 10/2005 | Hayball et al. | ............ | 709/227 |
| 7,016,964 B1 * | 3/2006 | Still et al. | ............ | 709/229 |
| 7,023,856 B1 * | 4/2006 | Washabaugh et al. | ..... | 370/395.1 |
| 7,170,905 B1 * | 1/2007 | Baum et al. | ............ | 370/467 |
| 7,177,921 B2 * | 2/2007 | Taguchi | ............ | 709/220 |
| 7,369,536 B2 * | 5/2008 | Donovan et al. | ............ | 370/352 |
| 7,516,198 B1 * | 4/2009 | Appala et al. | ............ | 709/219 |
| 7,543,330 B2 * | 6/2009 | Garbow et al. | ............ | 726/2 |
| 2002/0044553 A1 * | 4/2002 | Chakravorty | ............ | 370/392 |
| 2002/0065907 A1 * | 5/2002 | Cloonan et al. | ............ | 709/223 |
| 2002/0120760 A1 * | 8/2002 | Kimchi et al. | ............ | 709/230 |
| 2002/0144147 A1 * | 10/2002 | Basson et al. | ............ | 713/201 |
| 2004/0098606 A1 * | 5/2004 | Tan et al. | ............ | 713/200 |
| 2004/0117613 A1 * | 6/2004 | Edmondson | ............ | 713/150 |
| 2004/0228354 A1 * | 11/2004 | Anschutz et al. | ........ | 370/395.21 |
| 2005/0216421 A1 * | 9/2005 | Barry et al. | ............ | 705/64 |
| 2007/0143860 A1 * | 6/2007 | Hardt | ............ | 726/28 |
| 2008/0040469 A1 * | 2/2008 | Nishi | ............ | 709/223 |
| 2008/0107094 A1 * | 5/2008 | Borella et al. | ............ | 370/342 |
| 2009/0029777 A1 * | 1/2009 | Holt et al. | ............ | 463/42 |

OTHER PUBLICATIONS

Internet Priority Service (IPS) Capability Design/Development [online]. Department of Homeland Security [retrieved in Dec. 2003]. Retrieved from the Internet: <URL: http://www.eps.gov/spg/DISA/D4AD/DITCO/Reference-Number-NCS-N2/SynopsisP.html>.

* cited by examiner

*Primary Examiner* — Kwang B Yao
*Assistant Examiner* — Vincelas Louis

(57) ABSTRACT

An Internet Priority Service (IPS) provides to authorized users priority access to communication over the Internet during emergencies. Transmission of data packets from an authorized user that accesses the IPS are given priority for transmission over the Internet. The level of priority given to a data packet depends on the type of application associated with the data packet. Each user or group of users may also be given a respective IPS level of priority. Furthermore, for a particular authorized user, access to the IPS may be limited to a specific number of application types, which for example do not have high bandwidth requirements. Assigning different priority levels as a function of application type and user or group of users, and limiting IPS access to specific application types allows efficient methods of emergency communication to be implemented over the Internet during emergencies.

19 Claims, 5 Drawing Sheets

FIG. 2

| IPS LEVEL 210 | VIDEO CONFERENCING 215 | INSTANT MESSAGING 220 | E-MAIL WITH NO ATTACHMENTS; LOW PRIORITY 225 | E-MAIL WITH NO ATTACHMENTS; HIGH PRIORITY 230 | E-MAIL WITH ATTACHMENTS; LOW PRIORITY 235 | E-MAIL WITH ATTACHMENTS; HIGH PRIORITY 240 | CHAT 245 | VOICE 250 | WEB BROWSING SITE A 255 | WEB BROWSING SITE B 260 | GAMES 265 |
|---|---|---|---|---|---|---|---|---|---|---|---|
| I | 2 | 5 | 5 | 5 | 3 | 4 | 5 | 3 | 4 | 3 | 0 |
| II | 1 | 4 | 3 | 4 | 2 | 3 | 4 | 2 | 3 | 2 | 0 |
| III | 0 | 3 | 2 | 3 | 2 | 3 | 3 | 1 | 3 | 1 | 0 |

200

SELECTIVE INTERNET PRIORITY SERVICE

FIELD OF THE INVENTION

The invention relates to IPS (Internet Priority Service) for data packet transmission over the Internet.

BACKGROUND OF THE INVENTION

ETS (Emergency Telecommunications Services) have been implemented for telephone services including wire and wireless telephone services, in which in the event of an emergency a priority service is provided to particular users or groups of users over other users. IPS (Internet Priority Service) is being proposed as an analogue to ETS. The purpose of IPS is to support national security and emergency preparedness communications over the Internet during an emergency or an abnormal situation where the Internet is not able to support all communication demands. Such a situation could arise due to for example destruction of facilities, downing of cables, etc. in a disaster or terrorist attack or simply due to increase in traffic generated by people trying to find out what has happened to loved ones after the news of such an event is known. The design of the Internet is thought to be particularly robust against complete shut down and this makes the Internet well suited for authorized emergency communications.

One difference between telephone services and the Internet is that the former supports basically one type of service corresponding to phone calls while the Internet supports a plethora of services such as e-mail, instant messaging, voice over IP (Internet Protocol), and video conferencing for example. Phone calls each consume essentially the same amount of resources while different Internet application types consume widely different amounts of resources. For example, full motion and full resolution video conferencing makes use of far more bandwidth than instant messaging. Although the required resources depend greatly on the application type, generally the Internet infrastructure is not aware of what application a user is using. The Internet handles all IP packets uniformly. In an emergency situation, when resources are limited the current methods treat IP packets from a user that has invoked the IPS uniformly from one application type to another. This causes problems in that if the user is in a video conference and making use of a large bandwidth, other users invoking the IPS may not be able to communicate efficiently using for example e-mails which require far less bandwidth than video conferencing. Furthermore, if the user is in a video conference and has a higher priority than some other users that are attempting to send emergency related low bandwidth e-mails, these other users may be precluded for being able to send the low bandwidth e-mails due to priority being given to the user in the video conference. As such, current methods proposed for implementing IPS are inefficient in achieving the goal of emergency communication over the Internet.

SUMMARY OF THE INVENTION

In a network, one or more network elements have IPS (Internet Priority Service) functionality for participating in providing the IPS. In an emergency situation authorized users access the IPS and data packets associated with applications invoked by the authorized users are given priority when being transmitted over the Internet. A priority level given to a data packet is a function of the type of application being invoked. For example, a high priority may be given to e-mails which require a relatively low bandwidth whereas a lower priority may be given to video conferencing. Assigning a higher priority to e-mails prevents important e-mail communications from being compromised by the use of video conferencing during an emergency. This allows an efficient method of communication to be implemented for purposes of emergency situations.

In some embodiments of the invention, IPS is provided by Internet service providers in return for example for a retainer fee plus payment for IPS traffic actually carried out.

In some embodiments of the invention, the priority level is also a function of the users invoking the application. This allows an Internet service provider to provide IPS packages tailored for particular users or groups of users. Instead of fixing a fee based solely on the number of authorized users, the Internet service provider can negotiate to provide IPS for applications on an individual basis. For example, for a particular user or group of users only a selected number of application type may be available for IPS and/or each application type is given a respective priority level. Furthermore, when new applications become available the Internet service provider can provide IPS for data packets associated with these new applications.

In some embodiments of the invention, each user or group might be assigned an IPS level of priority and within each IPS level each application type is given a respective priority level for transmission of associated data packets. In an example implementation, a first user having a high IPS level of priority might be given high priority level for transmission of data packets associated with email and a lower priority level for transmission of data packets associated with video conferencing. Other users having a lower IPS level of priority might be given lower priority levels for transmission of data packets associated with video conferencing and e-mail than the respective priority levels of the first user. However, the priority level for transmission of data packets associated with e-mail given to the other users might nonetheless be higher than the priority level for transmission of data packets associated with video conferencing given to the first user. As such, in such a case when IPS is invoked, priority is given to e-mail messages sent by the other users over video conferencing data packets sent by the first user. This allows an efficient method of providing emergency communications during an emergency to be implemented.

In some embodiments of the invention, a network element in the system has an IPS function adapted to determine the priority levels for transmission of the data packets on the basis of the application types associated with the data packets. The IPS function is used to transmit data packets in a hierarchical manner by first transmitting the data packets having a higher priority level and then progressively transmitting the data packets having a lower priority level. In addition, in some embodiments of the invention the IPS function is also adapted to mark the data packets with an indicator of the priority level. This allows other network elements such as routers for example to transmit the data packets over the Internet according to the priority level marked with the indicator.

A network element in the network may have an IPS management function adapted to provide access to the Internet priority service for at least one application type of a plurality of application types.

In some embodiments of the invention, the IPS management function is further adapted to receive a request from a user requesting the Internet priority service and verify whether the user request is valid. In such embodiments of the invention, the access is provided to the user only if the request is valid.

In some embodiments of the invention, to verify whether the user request is valid, the IPS management function is adapted to request credentials from the user; receive the credentials; and verify whether the credentials are valid.

In some embodiments of the invention, the network element has a proxy function adapted to provide a secure link for access by users invoking the Internet priority service. In some embodiments of the invention, the proxy function is also adapted to provide the secure link for access to the IPS by a user at a remote network element. In particular, in some embodiment of the invention the proxy function is further adapted to provide the secure link using an SSL (Secure Socket Layer). Providing IPS cover the Internet effectively provides a VPN (Virtual Private Network) and using SSL capabilities provides a secure access to the IPS even if Internet resources such as addressing and routing are used. Furthermore, with SSL VPNs network elements of end users can access the IPS without the need for special software at the end user's network element. For example, in one implementation, a user accesses the IPS using a PC (Personal Computer) or PDA (Personal Digital assistant) having an SSL Web browser. Finally, in SSL VPNs the type of application being invoked is easily determined for example from the messaging used when the application is invoked.

In accordance with a first broad aspect, the invention provides a network device for participating in providing an Internet priority service for transmission of data packets each associated with an application type of a plurality of application types. The network element has an IPS (Internet priority Service) function. For each data packet, the IPS function determines which application type is associated with the data packet, and determines a priority level for transmission of the data packet. The priority level is a function of the application type associated with the data packet. The IPS function also transmits the data packets according to the priority levels of the data packets.

In some embodiments of the invention, for each data packet the IPS function is adapted to perform at least one of deep packet inspection and stateful inspection of the data packets to determine the application type associated with the data packet.

In accordance with a second broad aspect, the invention provides a network element for participating in providing an Internet priority service. The network element has an IPS management function adapted to provide user access to the Internet priority service for at least one application type of a plurality of application types. Each one of the plurality of application types has a respective associated priority level for transmission. The respective priority level of at least one of the plurality of application types is different than the priority level of at least one other application type.

In accordance with a third broad aspect, the invention provides, in a network element, a method of providing an Internet priority service for transmission of data packets each associated with an application type of a plurality of application types. The method involves, for each data packet: i) determining which application type is associated with the data packet; and ii) determining a priority level for transmission of the data packet. The priority level is a function of the application type associated with the data packet. The method also involves transmitting the data packets according to the priority levels of the data packets.

In accordance with a fourth broad aspect, the invention provides, in a network element, a method of participating in providing an Internet priority service. The method involves providing user access to the Internet priority service for at least one application type of a plurality of application types, each one of the plurality of application types having a respective associated priority level for transmission. The respective associated priority level of at least one of the plurality of application types is different than the priority level of at least one other application type of the plurality of application types.

In accordance with a fifth broad aspect, the invention provides an article of manufacture having a computer usable medium having computer readable program code means embodied therein for providing, in a network element, an Internet priority service for transmission of data packets each associated with an application type of a plurality of application types. The computer readable code means in the article of manufacture has computer readable code means for, for each data packet: i) determining which application type is associated with the data packet; and ii) determining a priority level for transmission of the data packet. The priority level is a function of the application type associated with the data packet. The computer readable code means in the article of manufacture also has computer readable code means for transmitting the data packets according to the priority levels of the data packets.

In accordance with a sixth broad aspect, the invention provides an article of manufacture having a computer usable medium having computer readable program code means embodied therein for participating in providing an Internet priority service. The computer readable code means in the article of manufacture has computer readable code means for providing user access to the Internet priority service for at least one application type of a plurality of application types. Each one of the plurality of application types having a respective associated priority level for transmission. The respective associated priority level of at least one of the plurality of application types is different than the priority level of at least one other application type of the plurality of application types.

BRIEF DESCRIPTION OF THE DRAWINGS

Preferred embodiments of the invention will now be described with reference to the attached drawings in which:

FIG. 2 is a table of priority levels for transmission of data packets over the network of FIG. 1, the priority levels being grouped into application type and user or group level;

DETAILED DESCRIPTION OF THE PREFERRED EMBODIMENTS

By way of background, in implementing ETS (Emergency Telecommunication Services) for telephone services, generally there is a priority model in which users or groups authorized for the ETS are divided into categories. There may be for example five categories. Authorized users from one category have priority over authorized users from another category when establishing calls.

The above priority model can be applied for IPS (Internet Priority Service). In particular, during congestion data packets may have to be discarded because there is insufficient bandwidth to carry them on a next hop to their destination. If necessary, beginning with data packets from users using the IPS which have a highest priority level down to data packets from users having a lowest priority and further down to data packets from users un-authorized to use the IPS, the data packets are transmitted until limitations on bandwidth no longer permit data packets to be transmitted over the Internet. Any remaining data packets are then discarded. Such a model in which priority levels are assigned on a user basis only, allows for a user having a high priority level to take up a large bandwidth resulting in resources being seriously limited and preventing other users having a lower IPS priority level from communication over the Internet using other application types such as e-mail for example which require much less bandwidth.

In embodiments of the invention the data packets are each associated with an application type. Application types include for example but are not limited to video conferencing, instant messaging, e-mail, e-mail with no attachment and low priority, e-mail with no attachment and high priority, e-mail with attachment and low priority, e-mail with attachment and high priority, chat, voice, web browsing, web browsing site specific, and games. Each application type has a respective associated priority level for transmission when access to the priority service is provided. The priority level of at least one of the application types is different than the priority level of at least one other application type. For example data packets associated with video conferencing might be given a lower priority for transmission than data packets associated with e-mail allowing low bandwidth e-mails to be given priority over high bandwidth video conferencing. Furthermore, as will be discussed in further details below in some embodiments of the invention the priority level associated with data packets of an application type also depends on the user's or group of user's IPS level.

In some embodiments of the invention, IPS is provided by Internet service providers in return for example for a retainer fee plus payment for IPS traffic actually carried out.

Figure 1:
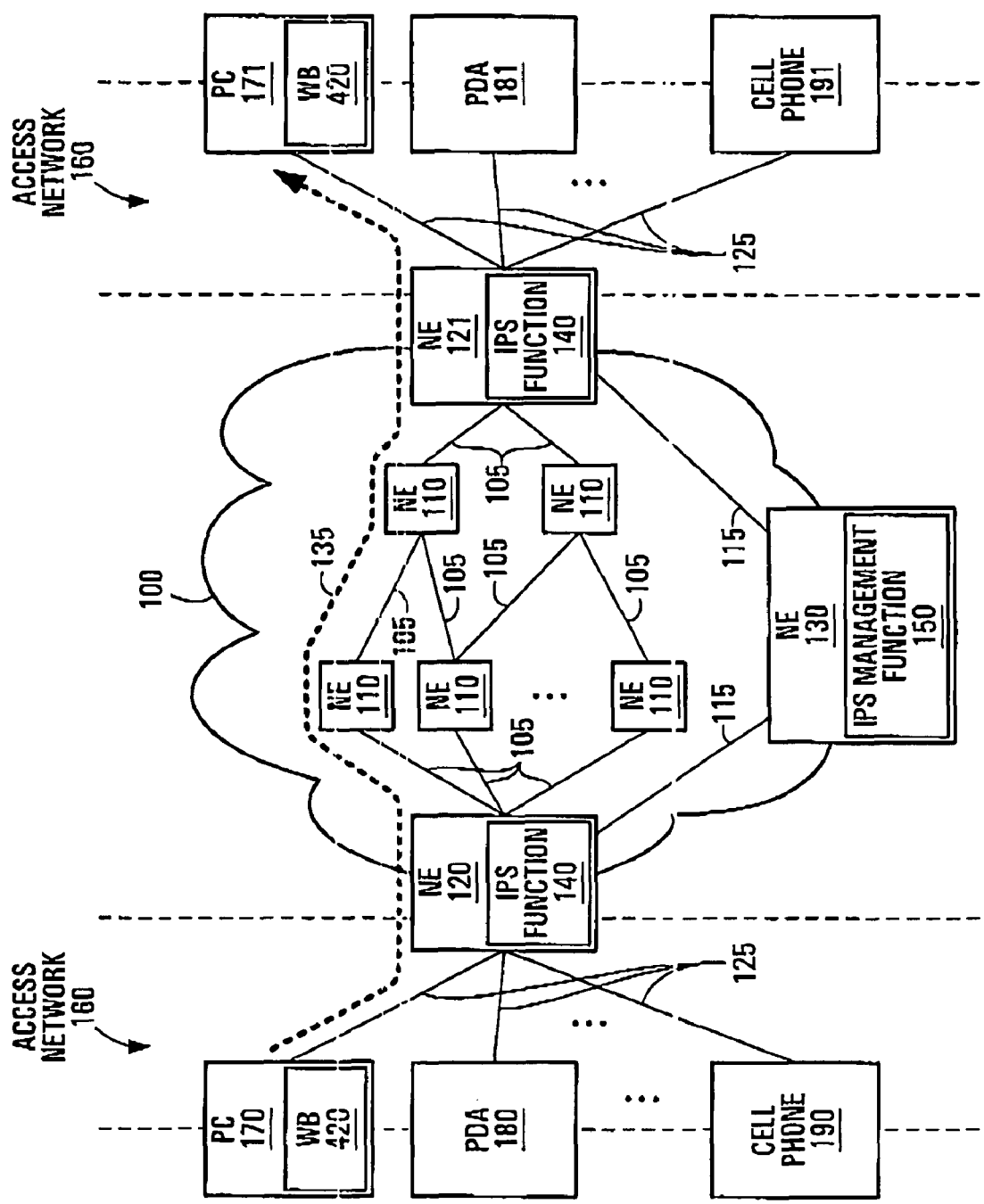
FIG. 1 is a block diagram of a network, according to an embodiment of the invention.

Referring to FIG. 1, shown is a block diagram of a network 100, according to an embodiment of the invention. The network 100 has network elements (NEs) 110, 120, 121 interconnected by way of links 105. The network 100 also has a network element 130 connected to network elements 120, 121 by way of links 115. Devices such as PCs (Personal Computers) 170, 171, PDAs (Personal Digital Assistants) 180, 181, and cell phones 190, 191 are connected to network elements 120, 121 by way of links 125 through an access network 160. The network elements 120, 121 are edge devices of the network 100 through which the PCs 170, 171, the PDAs 180, 181 and the cell phones 190, 191 access the network 100.

It is to be clearly understood that the invention is not limited to PCs, PDAs, and cell phones, and any suitable device capable of transmitting over the access network 160 may be used. Furthermore, the links 125 are shown as logical links and it is to be clearly understood that the PCs 170, 171, the PDAs 180, 181, and the cell phones 190, 191 generally access the network elements 120, 121 using network elements of the access network 160 (not shown for clarity). The PCs 170, 171 are equipped with a web browser (WB) 420. In some cases at least some of the PDAs 180, 181 and cell phones 190, 191 are also equipped with a web browser.

Data traffic from the PCs 170, 171, the PDAs 180, 181, and the cell phones 190, 191 propagates over the network 100 through network elements 120, 121 which are edge devices of the network 100. The network elements 120, 121 each have an IPS function 140 for assigning and checking the priority of data packets. In some embodiments of the invention, the IPS function 140 is implemented as software. The software can be implemented as any suitable combination of instructions stored in memory for execution by general or special purpose processors, firmware, ASICs (Application Specific Integrated Circuits), FPGAs (Field-Programmable Gate Arrays), and general or special purpose logic. Network element 130 has an IPS management function 150 which is used in conjunction with the IPS function 140 of network elements 120 for providing IPS. In some embodiments of the invention the IPS management function 150 is also implemented as software. The software can be implemented as any suitable combination of instructions stored in memory for execution by general or special purpose processors, firmware, ASICs (Application Specific Integrated Circuits), FPGAs (Field-Programmable Gate Arrays), and general or special purpose logic. The IPS management function 150 of network element 130 is managed by an Internet service provider for example that provides Internet Priority Services to users as part of other Internet services packages.

Figure 3A:
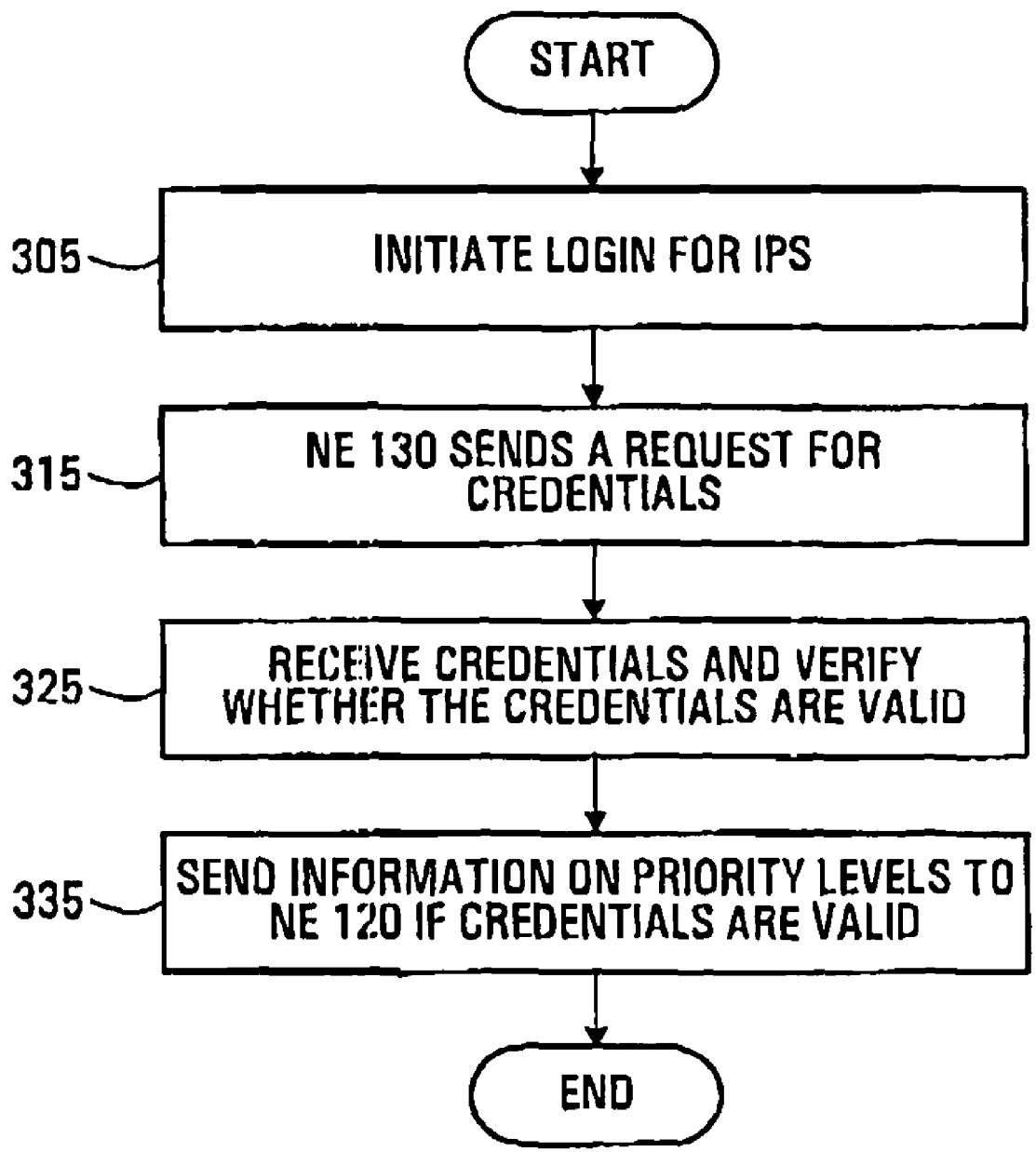
FIG. 3A is a flowchart of steps followed during login for IPS (Internet Priority Service), according to an embodiment of the invention.

An illustrative example of how a user having a subscription with an Internet service provider for IPS accesses the IPS will now be discussed with reference to FIGS. 1, 2, and 3A. In the illustrative example, a user at PC 170 invokes the IPS.

To make use of the IPS, the user logs in with the Internet service provider. An example implementation of a user login for IPS will now be described with reference to FIG. 3A. At step 305, login for IPS is initiated with the Internet service provider. In the example implementation, to login IPS the user at PC 170 invokes the web browser 420 and provides a user input requesting a home page having a URL associated with network element 130. Alternatively, the web browser and/or the request for the home page is invoked automatically during for example login on the PC 170.

Access to the home page which is provided by the management function 150 of the network element 130 is provided through network element 120 by way of links 125, 115.

In the illustrative example, the network element 130 sends a request to the computer 170 requesting credentials such as for example an identification of the user and a password from the user (step 315). The user enter the credentials and upon receiving the credentials the network element 120 sends the credentials to the network element 130 and the management function 150 of network element 130 verifies whether the credentials are valid (step 325). If the credentials are valid, the network element 130 sends to the network element 120 information on priority levels for transmission of data packets from the computer 170 each associated with a respective application type (step 335).

Various priority levels for transmission of data packets over the network 100 are shown in a table generally indicated by 200 in FIG. 2. A column 210 indicates IPS levels of priority available for subscription by individual users or groups of users. In Table 200 only three IPS levels of priority I, II, III are shown for clarity. More generally, there is at least one IPS level of priority. Columns 215, 220, 225, 230, 235, 240, 245, 250, 255, 260, and 265 indicate various priority levels for transmission of data packets associated with video conferencing, instant messaging, e-mail with no attachment and low priority, e-mail with no attachment and high priority, e-mail with attachment and low priority, e-mail with attachment and high priority, chat, voice, web browsing site A specific, web browsing site B specific, and games, respectively. Various priority levels for transmission of data packets are listed in Table 200 ranging from 0 to 5. More generally, there are two or more priority levels. In the example of FIG. 2, data packets with a priority level 5 are given a highest priority and the priority given to data packets decreases with decreasing priority level with a priority level 0 indicating no priority. Each user having access to the IPS is provided with one of the IPS levels of priority. Within an IPS level of priority there are different priority levels for transmitting data packets depending on the application type. For example, the level II high bandwidth data packets associated with video conferencing are given a priority level 1 whereas low bandwidth data packets associated with instant messaging are given a higher priority level 4. In some embodiments of the invention, one or more application types are broken down into categories each having a respective priority level associated with it. For example, in Table 200 for e-mail there are four categories identified in columns 230, 235, 240, 245. In another implementation there is only one category for e-mail. More generally, each application type has one or more categories. In Tables 200, as shown in column 215 for IPS level I a priority level 2 is given for transmission of data packet associated with video conferencing, however, as shown in column 230 for IPS level II a priority level 4 is given for transmission of data packets associated with high priority e-mails with no attachments. As such, data packets from high priority e-mails sent by a user having an IPS level II priority have priority over data packets associated with video conferencing sent by another user having an IPS level I priority. In this way, important high priority e-mail messages from users having IPS level II priority are not precluded from being sent because users having IPS level I priority are using large amounts of bandwidth. Instead, the e-mails are given priority over video conferencing.

In the illustrative example, the user logging in has access to level II priority and upon receipt of valid credentials from the user, the network element 130 sends information on the level II priority levels to network element 120 for use by the IPS function 140 of network element 120 in transmitting data packets received from the PC 170. In the illustrative example of FIG. 3A, once the user has logged in with the Internet service provider for IPS, each time a new application invoked by the user data pickets associated with the new application are given IPS treatment. Alternatively, when a new application is invoked, the user is queried as to whether IPS treatment is to be given to data packets associated with the new application.

The method used by the network element 120 in participating in the transmission of data packet will now be described below with reference to FIG. 3B. In particular, an illustrative example is described in which the user invokes an application at the PC 170 and data packets are sent to the PC 171 through the network element 120 along a path 135. While the network element 120 receives data packets from the PC 170, the network element 120 may also receive data packets from other network elements such as the PDA 180 and the cell phone 190.

Figure 3B:
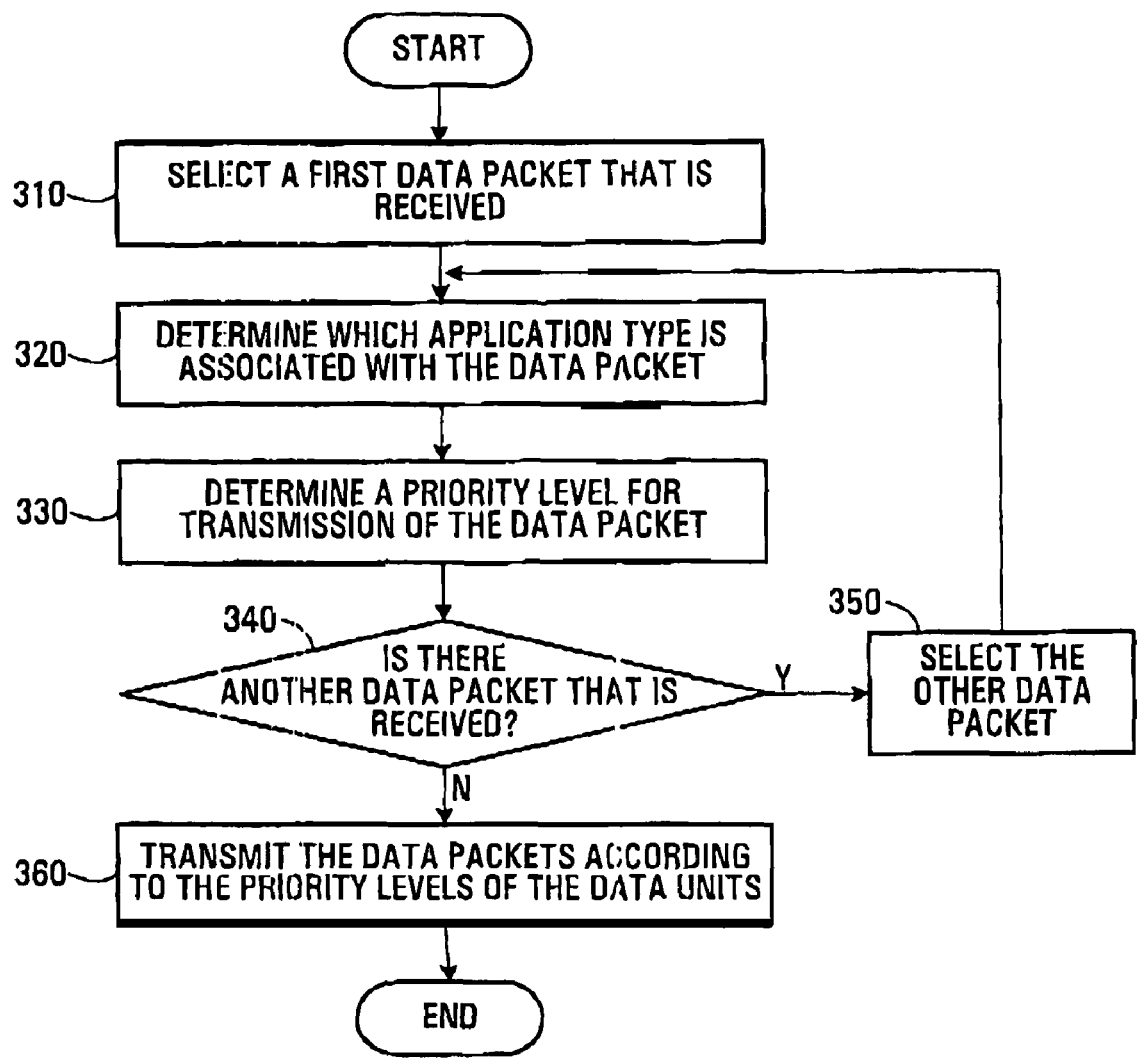
FIG. 3B is a flow chart of steps followed by a network element of the network of FIG. 1 in providing IPS.

With reference to FIG. 3B, at step 310 a first data packet that is received by the network element 120 through the access network 160 is selected. The IPS function 140 determines which application type is associated with the data packet (step 320) and determines a priority level for transmission of the data packet (step 330). At step 340 if there is another data packet that is received then the data packet is selected (step 350) and step 320, 330, 340 are repeated. At step 340 if there are no other data packets the data packets are transmitted according to the priority levels of the data packets (strip 360).

In some implementations, at Step 320 the IPS function 140 performs well-known deep packet and/or stateful inspection to determine the application type associated with a flow of data packets. Deep packet inspection can be performed using for example a SHASTA BSN 5000 network element. It is to be clearly understood that the invention is not limited to deep packet inspection and/or stateful inspection for determining an application type associated data packets and in other implementations other methods are used. For example, in some cases the application type is explicitly signalled to the IPS function 140. In particular, for example for an application that uses a session protocol such as SIP (Session Initiation Protocol) for example, the application type may be explicitly signalled to the IPS function 140 by a call server.

In the illustrative example, as shown in Table 200 of FIG. 2 there are three IPS levels of priority for different users or groups of users and at step 330 the user or network element associated with the data packet is determined and the priority level for transmission of data packets specific to the application type and the user is obtained using the information received from the network element 130 during validation of the user request for IPS.

At step 360, the data packets are queued for transmission in a hierarchical manner and transmitted by first transmitting the data packets having a higher priority level and then progressively transmitting the data packets having a lower priority level until more packets of higher priority level are queued for transmission. Any arriving packets of lower priority level for which there is no queue space are discarded. It is to be clearly understood that this is only one possible mechanism for providing priority transmission of data packets through network elements and that one of skill in the art would recognize there are other possible mechanisms.

In some embodiments of the invention, at step 360 each data packet is marked with an indicator of the priority level for transmission of the data packet. In some embodiments of the invention, a set of diff-serv code points are used for marking a data packet with an indicator of a priority level for transmission. Marking the packet with an indicator of the priority level allows other network devices to transmit the data packet according to the priority level. For example, in the illustrative example a data packet at network element 120 intended to be transmitted to the PC 171 along path 135 is marked with the indicator of the priority level using the IPS function 140 of network element 120. The network elements 110 along path 135 and the network element 121 make use of the priority level associated with the data packet to transmit the data packet throughout the network 100 with the associated priority level.

In some cases, the data packet received through the access network 160 has an application field indicating an application type and/or a priority for example. A data packet might have for example an application field indicating a high priority e-mail with one or more attachments. The priority might be marked by the user when composing the e-mail message. In some embodiments of the invention, the IPS function 140 determines the application and/or the priority from the application field to determine the priority level to be used in transmitting the data packet.

In the embodiment of FIG. 1, the network elements 120, 121 operating as edge devices are given IPS functionality by implementing the functionality of the IPS function 140. As will now be described with reference to FIG. 4, in other embodiments of the invention some or all of the functionality of the IPS function 140 is implemented at the network element 130. Similarly, in other embodiments of the invention, at least some of the functionality of the IPS management function 150 of network element 130 is implemented in network elements 120, 121.

Figure 4:
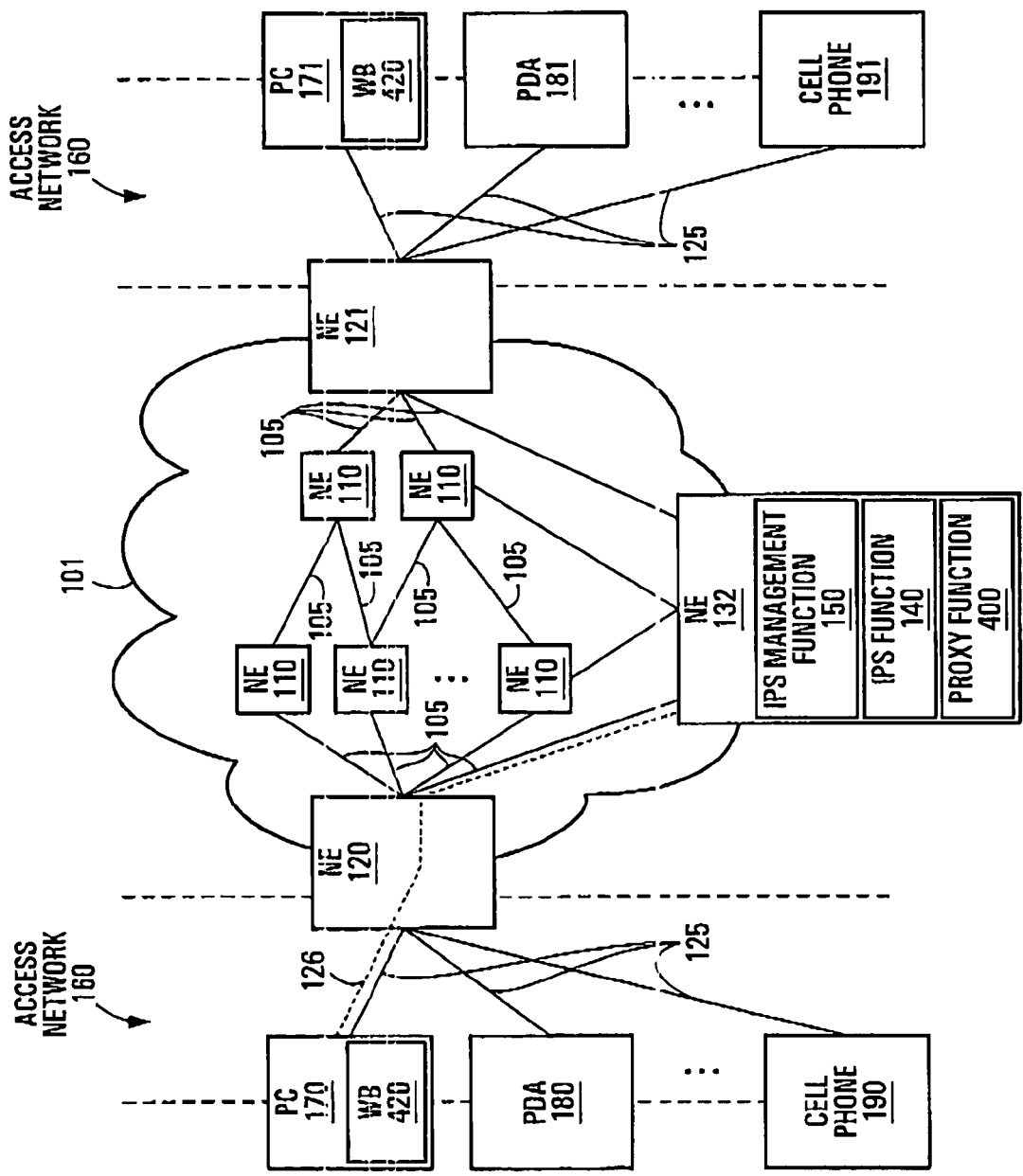
FIG. 4 is a block diagram of a network, according to another embodiment of the invention.

Referring to FIG. 4, shown is a block diagram of a network 101, according to another embodiments of the invention. The network 101 is similar to the network 100 of FIG. 1 except for some differences. In particular, the network element 130 is replaced with a network element 132, which is connected to network elements 120, 121, and 110 by way of links 105. The network element 132 has IPS management function 150, IPS function 140, and a proxy function 400. In some embodiments of the invention, the IPS management function 150, the IPS function 140, and the proxy function 400 are implemented as software. This software can be implemented as any suitable combination of instructions stored in memory for execution by general or special purpose processors, firmware, ASICs (Application Specific Integrated Circuits), FPGAs (Field-Programmable Gate Arrays), and general or special purpose logic.

The network element 132 is an SSL (Secure Socket Layer) VPN (Virtual Private Network) server or otherwise known as an SSL portal and operates as an application proxy for applications such as Wet) applications for example, invoked remotely. The Web applications include a HTTP (HyperText Transfer Protocol) for example and have a secure variant such as SHTTP (Secure HyperText Transfer Protocol) for example. In addition to Web based applications, the proxy function 400 proxies other applications such as SMTP (Standard Mail Transport Protocol) POP for e-mail, and SIP (Session Initiation Protocol) and RTP (Real Time Protocol) for Voice over IP telephony for example.

In the embodiment of FIG. 4, the network elements 120, 121 do not have the IPS function 140 and the IPS functionality is provided by the network element 132. In particular, users at PCs 170, 171, PDAs 180, 181, and cell phones 190, 191 access the IPS along communications paths (only one communications path 126 is shown for clarity) through links secured using an SSL protocol.

In particular, in some implementations the communications path 126 is established using the SSL protocol which secures the links 115, 125 along the communication path 126 between the PC 170 and the NE 130 is an SSL session. The secure links 115, 125 along the communication path 126 provide protection against spoofing.

When there is an emergency, an IPS user communicates with the network element 132. As an illustrative example, an emergency occurs and a user at the PC 170 requires IPS. The user at the PC 170 communicates with the network element 132 by way of communication path 126 between the PC 170 and the NE 130 through the access network 160. The IPS management function 150 of the network element 132 provides a login window and the user provides his/her credentials for access to the IPS. The user can then invoke applications; however, data traffic from the PC 170 is encrypted as directed by the SSL session and directed to the network element 132 by way of the communication path 126. The proxy function 400 decrypts the data traffic form the PC 170; and data packets associated with the data traffic are marked with priority information using the IPS function 140 and sent through the network 101. Any one or more of NE 110, 120, 121 receiving the data packets, transmits the data packets according to the priority information.

In the illustrative example, when the user invokes an application at the PC 170 over the SSL, the messaging between the PC 170 and the network element 132 depends on the application type of the application being invoked. As such, the application type and hence the priority level for transmission of the data packets is determined from the messaging between the PC 170 and the network element 132. This provides an alternative to deep packet inspection for determining the application type.

To illustrate how the network element 132 functions as a proxy for other network elements, an illustrative example will now be described in which the network element 132 functions as a proxy for a web browsing application invoked at the PC 170. In the illustrative examples a user at the PC 170 invokes the web browsing application using the web browser 420 and a secure link through the communications path 126 between the PC 170 and the network element 132 is established. The user at PC 170 requests at web page that is located at the PC 171. The request is received at the network element 132 and the proxy function 400 forwards the request for the web page on behalf of the PC 170. The PC 171 receives the request and forwards the web page to the network element 132. The web page may contain URLs (Uniform Resource Locators) and the proxy function 400 translates the URLs in the web page into SHTTP URLs. The proxy function 400 then forwards the web page together with the SHTTP URLs to the PC 170. If the user at PC 170 selects a link to another web page contained in the web page, the computer 170 sends a request to the network element 132 containing one of the SHTTP URLs that is associated with the link. Upon receipt of the request at the network element 132, the proxy function 400 translates the SHTTP URL back into the original URL and forwards the request for the other web page on behalf of the PC 170.

The use of SSL provides a secure way to access IPS. In addition, the SSL provides a VPN in which a user can access the IPS without any requirement of any special software at the PCs 170, 171, the PDAs 180, 181, and the cell phones 190, 191. In particular, a user can access the IPS from any device such as a PC, PDA or cell phone for example that has an SSL enabled web browser. For example, in an emergency situation where an authorized user does not have access to his/her PC, the user can access the IPS through NE 132 using any network element having an SSL enabled web browser. In some embodiments of the invention some software is implemented in any one or more of the PCs 170, 180, the PDAs 180, 181, and the cell phones 190, 191 for establishing secure paths.

Numerous modifications and variations of the present invention are possible in light of the above teachings. It is therefore to be understood that within the scope of the appended claims, the invention may be practiced otherwise than as specifically described herein.

I claim:

1. A network element for participating in providing an IPS (Internet Priority Service) directed to emergency preparedness communications over the Internet that involves transmission of data packets each associated with an application type of a plurality of application types, the network element comprising:
   an IPS function adapted to:
   a) for each data packet:
      i) determine which application type is associated with the data packet; and
      ii) determine a priority level to be assigned the data packet, the assigned priority level being a function of the application type associated with the data packet and a function of an IPS level of priority;
   b) transmit the data packets according to the assigned priority levels of the data packets;
   wherein the IPS function is further adapted to:
   responsive to invocation of an application by a user authorized to use the IPS, confirm with the user whether data packets associated with the application require the IPS; and
   if the associated data packets require the IPS, provide the IPS for the associated data packets.

2. A network element according to claim 1 wherein for each data packet the IPS function is further adapted to:

determine a user or group of users associated with the data packet, the assigned priority level for transmission of the data packet also being a function of the user or group of users associated with the data packet.

3. A network element according to claim 2 wherein for a first user or group of users the priority level for transmission of data packets associated with a first application type is higher than the priority level for transmission of data packets associated with a second application type assigned to a second user or group of users, the IPS level of priority of the second user or group of users being higher than the IPS level of priority of the first user or group of users.

4. A network element according to claim 3 wherein for each data packet, to determine the priority level for transmission of the data packet the IPS function is adapted to:
if the application type associated with the data packet is from a subset of application types of the plurality of application types, select a priority level that provides priority services for transmission of the data packet, the subset of application types being a respective subset of application types for the user or group; and
if the application type associated with the data packet is not from the respective subset of application types for the user or group, select a priority level that provides no priority services for transmission of the data packet.

5. A network element according to claim 1 wherein the IPS function is adapted to transmit the data packets in a hierarchical manner by:
first transmitting the data packets having a higher priority level and then progressively transmitting the data packets having a lower priority level.

6. A network element according to claim 5 wherein to transmit the data packets according to the priority levels of the data packets for each data packet the IPS function is further adapted to:
mark the data packet with an indicator of the priority level for transmission of the data packet for allowing other network elements to transmit the data packet according to the priority level for transmission of the data packet.

7. A network element according to claim 1 wherein the data packets comprise application fields each containing at least one indicator of an application type indicator and a priority indicator, and wherein for each data packet the IPS function is adapted to determine the priority level for transmission of the data packet using the at least one indicator.

8. A network element for participating in providing an IPS (Internet Priority Service) directed to emergency preparedness communications over the Internet, the network element comprising:
an IPS management function adapted to:
provide user access to the IPS for at least one application type of a plurality of application types, each one of the plurality of application types having a respective associated priority level for transmission, the respective associated priority level of at least one of the plurality of application types being different than the priority level of at least one other application type of the plurality of application types, and a function of an IPS level of priority;
wherein the network element comprises an IPS function adapted to:
responsive to invocation of an application by a user authorized to use the IPS, confirm with the user whether data packets associated with the application require the IPS; and
if the associated data packets require the IPS, provide the IPS for the associated data packets.

9. A network element according to claim 8 wherein the IPS management function is further adapted to:
receive a request from a user requesting the IPS; and
verify whether the user request is valid, the user access being provided to the user only if the request is valid.

10. A network element according to claim 8 wherein the at least one application type comprises fewer application types than the plurality of application types.

11. A network element according to claim 8 wherein to provide the user access to the IPS the IPS management function is further adapted to send information to other network elements indicating that the access to the priority service is enabled.

12. A network element according to claim 8 comprising a proxy function adapted to serve as a proxy for applications invoked remotely.

13. A network element according to claim 12 wherein the proxy function is further adapted to provide a secure link for access by users invoking the IPS.

14. A network element according to claim 13 wherein the proxy function is further adapted to provide the secure link using an SSL (Secure Socket Layer) protocol.

15. A network element according to claim 8 wherein the IPS function is further adapted to:
a) for each data packet of a plurality of data packets, the data packet being associated with an associated application type of the plurality of application types:
i) determine which associated application type is associated with the data packet; and
ii) determine the respective associated priority level for transmission from the associated application type associated with the data packet, the respective associated priority level for transmission being a function of the associated application type associated with the data packet and a function of an IPS level of priority; and
b) transmit the data packets according to the priority levels of the data packets.

16. In a network element, a method of providing an IPS (Internet Priority Service) directed to emergency preparedness communications over the Internet that involves transmission of data packets each associated with an application type of a plurality of application types, the method comprising:
b) for each data packet:
i) determining which application type is associated with the data packet; and
ii) determining a priority level for transmission of the data packet, the priority level being a function of the application type associated with the data packet and a function of an IPS level of priority; and
b) transmitting the data packets according to the priority levels of the data packets;
the method further comprising:
responsive to invocation of an application by a user authorized to use the IPS, confirming with the user whether data packets associated with the application require the IPS; and
if the associated data packets require the IPS, providing the IPS for the associated data packets.

17. In a network element, a method of participating in providing an IPS (Internet Priority Service) directed to emergency preparedness communications over the Internet, the method comprising:
responsive to invocation of at least one application type of a plurality of application types by a user authorized to use the IPS, confirming with the user whether data packets associated with the at least one application require the IPS; and if the associated data packets require the IPS, providing user access to the IPS for the at least one application type based on:

each one of the plurality of application types having a respective associated priority level for transmission, the respective associated priority level of at least one of the plurality of application types being different than the priority level of at least one other application type of the plurality of application types; and an IPS level of priority.

18. A non-transitory computer-readable medium having computer executable instructions stored thereon which, when executed by one or more computers in a network element, cause the network element to perform a method of providing an IPS (Internet Priority Service) directed to emergency preparedness communications over the Internet that involves transmission of data packets each associated with an application type of a plurality of application types, the method comprising:

for each data packet:
 i) determining which application type is associated with the data packet; and
 ii) determining priority level to be assigned to the data packet, the assigned priority level being a function of the application type associated with the data packet and a function of an IPS level of priority; and transmitting the data packets according to the priority levels of the data packets;

the method further comprising:

responsive to invocation of an application by a user authorized to use the IPS, confirming with the user whether data packets associated with the application require the IPS; and if the associated data packets require the IPS, providing the IPS for the associated data packets.

19. A non-transitory computer-readable medium having computer executable instructions stored thereon which, when executed by one or more computers in a network element, cause the network element to perform a method of providing an IPS (Internet Priority Service) directed to emergency preparedness communications over the Internet, the method comprising:

responsive to invocation of at least one application type of a plurality of application types by a user authorized to use the IPS, confirming with the user whether data packets associated with the at least one application require the IPS; and if the associated data packets require the IPS, providing user access to the IPS for the at least one application type based on:

each one of the plurality of application types having a respective associated priority level for transmission, the respective associated priority level of at least one of the plurality of application types being different than the priority level of at least one other application type of the plurality of application type; and an IPS level of priority.

* * * * *